Aug. 30, 1960     E. R. STANDFUSS     2,950,660
ROAD SURFACING MATERIAL SPREADER
Filed Oct. 21, 1957     2 Sheets-Sheet 1
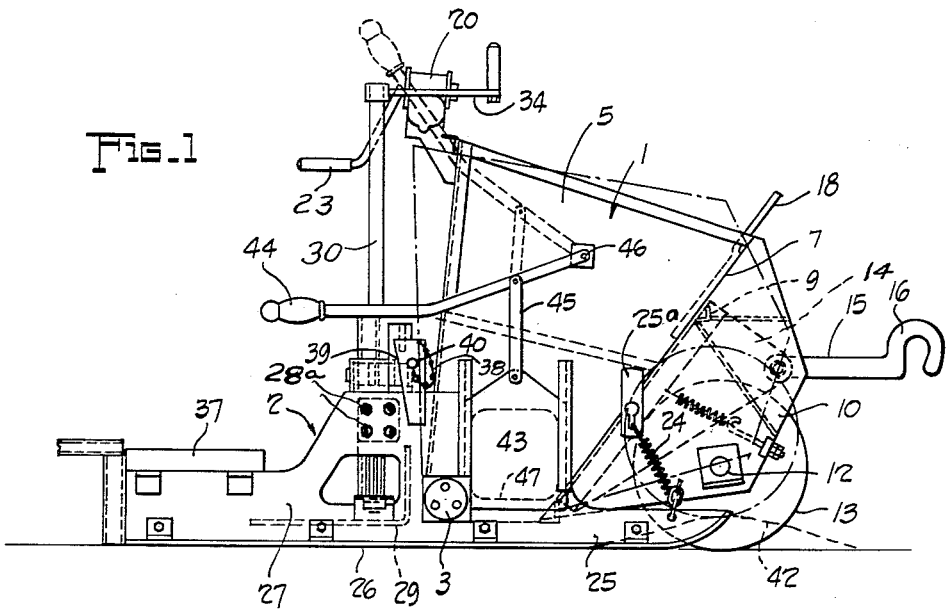
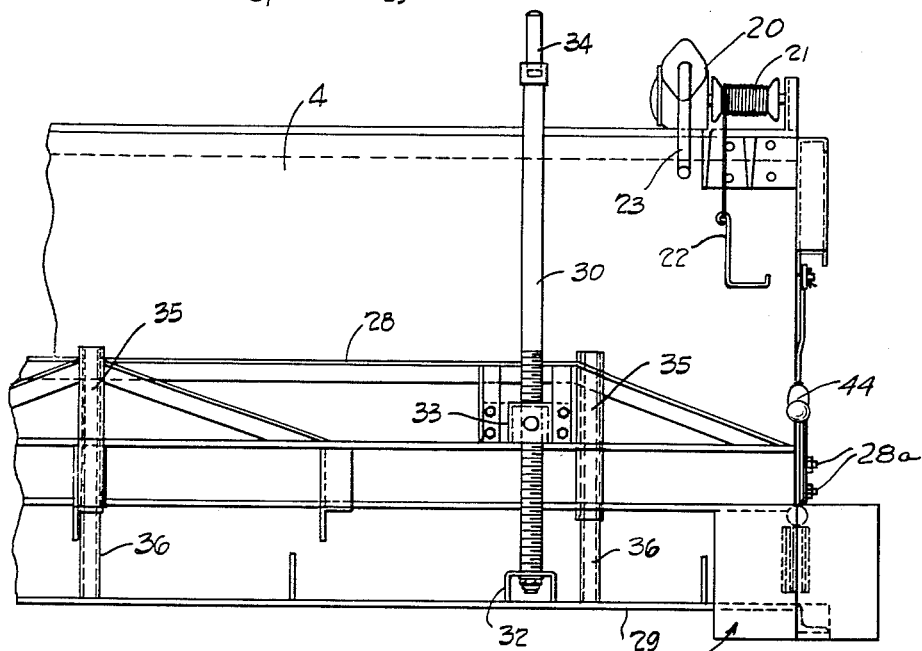
INVENTOR.
E. R. STANDFUSS
BY Robb & Robb
attorneys Aug. 30, 1960  E. R. STANDFUSS  2,950,660
ROAD SURFACING MATERIAL SPREADER
Filed Oct. 21, 1957  2 Sheets-Sheet 2

INVENTOR.
E. R. STANDFUSS
BY Robb & Robb
 attorneys

United States Patent Office 2,950,660
Patented Aug. 30, 1960

2,950,660

ROAD SURFACING MATERIAL SPREADER

Ernest R. Standfuss, Bucyrus, Ohio, assignor to The Burch Corporation, Crestline, Ohio, a corporation Filed Oct. 21, 1957, Ser. No. 691,385

2 Claims. (Cl. 94—46)

This invention relates to material spreading machines and primarily to such machines as are usually availed of to spread bituminous material, base stone, gravel or other aggregate.

Generally machines of the broad type are either mechanically complicated and thus require maintenance of substantial extent as well as highly skilled operators, or they are so simplified as to perform a less than completely satisfactory result, particularly having reference to the level of the surface of the spread material.

The machine hereof is arranged to overcome objections above pointed out, since it combines the attributes of the first type of machine mentioned as to surface produced, with those of the latter type which reside in the simplicity of construction, operation and maintenance.

From a construction standpoint, the machine hereof involves two basic units broadly speaking, a hopper and storage unit and a levelling unit, these units being combined in a manner to avail of the required interaction necessary to lay down a uniformly level mat or strip of material.

Further the machine hereof, while self-contained from the standpoint of result produced, is intended to be towed by a truck or the like, from which the machine receives the material to be spread during movement. The towing vehicle is replaced when empty, by another vehicle to which the machine hereof may be likewise connected for movement.

Inasmuch as conditions of the subgrade or surface over which the machine hereof is often caused to travel, obviously vary in many respects, flexibility is necessary and provisions not only for movement of part of the machine without affecting the desired level surface of the material being spread must be made. Adjustment of the spreading thickness as well as for different types of material spread being occasionally necessary, the machine is arranged to support an operator and readily accessible and easily operable means are provided to effect the necessary adjustment.

The machine hereof being comprised of two basic units, is not only flexible as indicated but the units are constructed so as to be connected together for simultaneous travel movement, and separate movement over variations in the subgrade so that the level of spread material is not varied undesirably. The arrangement and construction of the units is such that the levelling means is supported during spreading movement by parts that tend to equalize the variations or minimize the effect thereof on the said means.

With the foregoing general description of the machine and its characteristics in operation, in mind, a principal object of the invention will be seen to comprise the provision of a simple, effective spreading machine for a wide variety of materials, the parts of the machine being arranged to provide a uniform surface on a subgrade, not necessarily precisely level.

Another important object of this invention is to provide a machine adapted to be towed by a material supplying vehicle, which machine will receive and store such material in one unit, distribute it on a surface to be covered, so as to be acted on by a second unit, such second unit being supported during movement in a manner to minimize variations in the said surface to be covered by the supporting means for the said second unit.

Yet another object of this invention is to provide novel means to support the hopper and storage unit of the machine during movement of the entire machine while spreading, and yet the separate units are connected for travel spreading action so as to move relatively to one another.

Other and further objects of the invention will be understood from a consideration of the specification appended hereto and set forth in the drawings wherein:

Figure 1 is an end view, illustrating separate units and relative positions thereof.

Figure 2 is a fragmentary view of the rear of Figure 1, being largely substantially one-half of the machine, the opposite half being similar but of the opposite hand.

Figure 3:
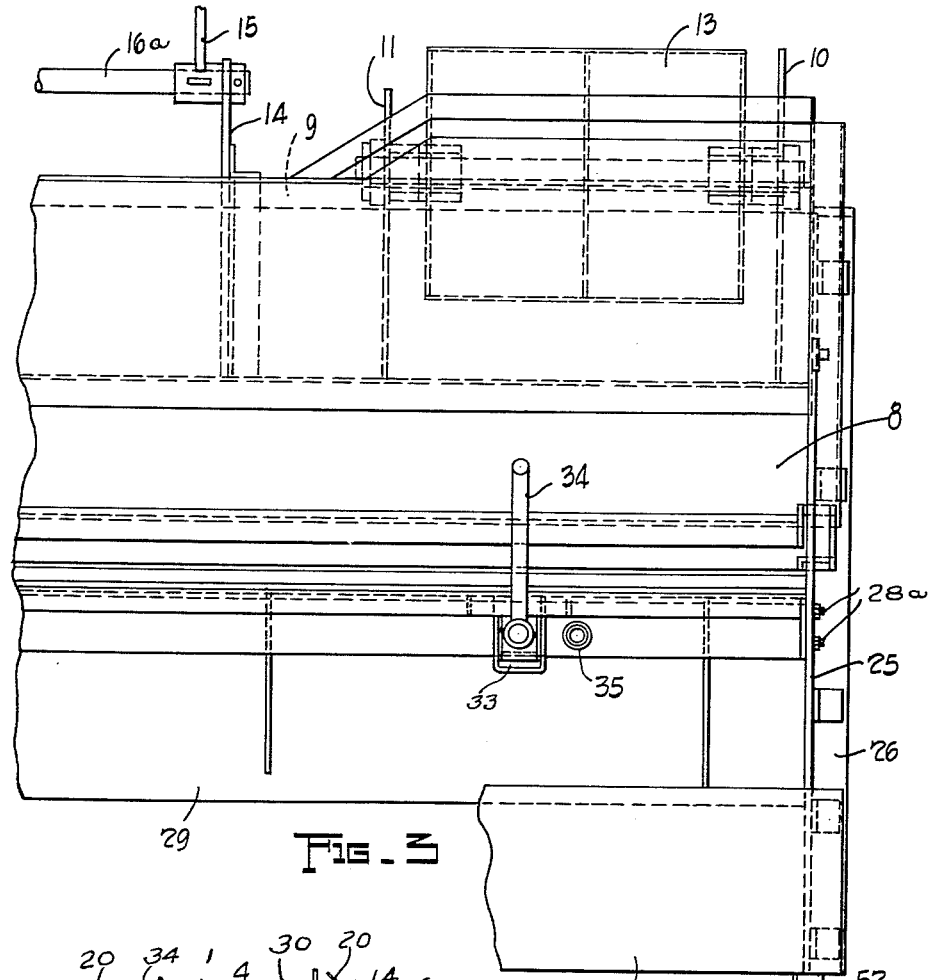
Figure 3 is a top plan view showing the various parts of the machine, said view being of substantially one-half of the machine the other half being virtually identical but of the opposite hand.

Referring now to the drawings, and particularly Figure 1, initially, the machine hereof is shown as being comprised of a hopper and storage unit generally designated 1 and a spreading and levelling unit generally designated 2. The units being separate largely, are connected together at the trunnions indicated at 3 so that the hopper and storage unit 1 may be moved pivotally independently of the spreading and levelling unit 2 and yet the hopper and storage unit 1 is supported at least partially by the said unit 2 for purposes which will be hereinafter set forth.

Figure 4:
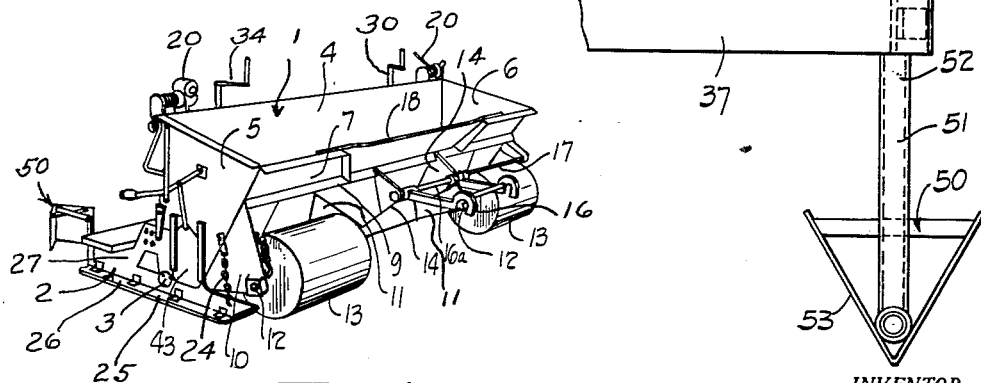
Figure 4 is a perspective view on a somewhat smaller scale showing the hopper and storage unit of the machine, its supporting means therefor and the spreading and levelling unit as engaged therewith.

Describing the hopper and storage unit 1 more in detail, the same will be seen to comprise as viewed in Figure 4 a hopper including a transverse rear side member 4 of substantial extent and normally extending substantially vertically, the ends of which are the longitudinal trapezoidal shaped sides 5 and 6, the forward edges of said sides 5 and 6 being connected by a further side 7, the sides 4 and 7 converging toward one another and providing an opening 8 as seen in Figure 3, through which material deposited in the hopper storage unit 1 may be deposited on a subgrade or the like.

The forward wall 7 of the hopper and storage unit 1 is provided with suitable stiffening means 9, to which are fastened generally triangular shaped brackets 10 at the opposite ends of the walls 7, such brackets being substantially duplicated as at 11, see Figure 4, so as to support at the pivot points 12 suitable rollers 13, there being a pair of these rollers used and mounted at the opposite ends of the hopper and storage unit. The rollers 13 are not only intended to support the hopper and storage unit in conjunction with the trunnions at 3 so as to permit a certain amount of relative movement of the hopper and storage unit 1 with respect to the levelling and spreading unit 2 but also to iron out any tire marks or tracks left by a towing vehicle attached to the forward part of the hopper and storage unit as will now be described.

About in the center of the hopper and storage unit and extending forwardly therefrom are the triangular shaped brackets 14, there being two of these and spaced some little distance apart, to which are fastened the drawbar unit 15, comprised of a pair of forwardly extending arms and hook elements 16 at the forward ends thereof, the arms being attached to the brackets 14 by means of suitable shaft such as 16a so as to be pivotably mounted with respect to such shaft. The towing vehicle is arranged to support and provide a connecting element for the arms and hook elements 16 as will be readily understood, the arms and hook elements 16 being adjustably operable by means of a bar 17 extending to one side so that the hook members may be raised and lowered as a unit and thus obviate the necessity for the operator to crawl between the machine hereof and the towing vehicle.

It should be pointed out that the forward wall 7 of the hopper and storage unit 1 is equipped with a flexible member such as 18, which member will prevent the material from falling forwardly from the truck that is being used to tow the machine hereof and from which material is being dumped into the hopper as will be readily apparent.

On the rear wall 4 of the hopper and storage unit 1, suitable winch units 20 are provided, for the purpose of raising the entire machine off the surface and attaching the same to the tail gate of a dump truck or the like, these winches 20 being provided with suitable cable 21 thereon and hook elements 22 connected to said cable 21. As will be apparent by manipulating the winch units by suitable cranks 23 provided, the hook elements 22 may be connected to the tail gate and the machine as a whole raised off of the ground by the winch units 20. The connection of the hopper and storage unit 1 with the spreading and levelling unit 2 is by means of the trunnions 3 provided. Suitable chain parts 24 are connected to parts 25a mounted on the end walls 5 and 6 of the hopper and storage unit 1, the said chain units 24 being connected at their other ends to skid members 25 of the spreading and levelling unit 2 to limit oscillation of the hopper with respect to the runners.

Turning now to a description of the levelling and spreading unit 2, it will be understood that a runner 25 is provided at each side of the machine, said runner having a ground engaging shoe 26 provided therefor and a body 27, about of the form shown in Figure 1, the trunnions 3 obviously being provided in each runner member 25 so as to connect the hopper and storage unit 1 thereto.

Extending between the runners and rigidly fastened thereto is a frame 28, the frame 28 being fastened by means of bolts or other means 28a, fastening the frame 28 to each runner and thus providing a substantially rigid unit as a whole.

Extending between the runner units and being of a substantially L-shaped form in end view is the strike-off member 29 which member 29 is supported by vertically extending adjusting screws 30, there being one of these at or adjacent the ends of the screed 29 and being fastened to the screed 29 by means of the brackets 32 provided therefor.

Above the brackets 32 and mounted on the frame 28 are the nut units 33 through which the adjusting screws 30 pass, the adjusting screws being manipulated by suitable cranks 34 at the upper ends thereof.

In order to effect a guided operation of the screed 29, suitable tubular guide members are fixed to the frame 28 and indicated at 35, mating tubular members 36 being fastened to the screed 29 and thus guiding the movement of the screed in its up and down operation. The nut units 33 are arranged so that the screed and screws 30 therefor may be separately adjusted at its ends as will be readily understood.

A platform 37 mounted on the rear extremities of the runners 25 is provided so as to support an operator, the operator being thus able to manipulate the cranks 34 therefrom and thus adjust the screed 29 as necessary either preliminary to travel movement or during such movement.

Since under certain conditions such as when the machine is lifted up for travel to another job it will be desirable to limit the oscillating movement as between the hopper and storage unit 1 and the spreading and levelling unit 2 to virtually none, suitable chains and connecting means therefor indicated at 38 are provided at opposite sides of the hopper and spreading unit and arranged to support pins which are inserted in mating openings in arms 39 extending upwardly from the runners 25 and openings 40 formed in parts of the hopper unit walls 5 and 6. This effects a locking of the units against movement with respect to each other. Of course the normal condition of these locking means is that of disengagement and such as to permit the oscillation of the hopper and storage unit 1 with respect to the runners so that movement of the rollers 13 over a bump such as indicated in dotted lines at 42 in Figure 1, without too much limitation to adversely affect the position of the runners 25 and the screed 29 supported thereby, the dotted line position of the hopper and storage unit 1 being indicated in such figure when the rollers are on the bump.

Since under certain conditions it may be desirable to provide for the spreading of a certain amount of the aggregate or other material in the hopper and storage unit 1 beyond or outside of the runners 25, sliding gates 43 are provided arranged in guides mounted on the runner units, and arranged for up and down movement by means of a handle 44 through linkage 45 connected to the gate 43, there being one each of these gates at opposite sides of the machine if desired. Obviously upward movement of the handle 44 being pivoted at 46 will cause the gate 43 to move upwardly through the link 45 and permit the outward movement of aggregate through an opening provided in the wall 5 in general alinement with the opening 47 in the runner body 27.

In order to prevent any permanent impression of the runner from being formed in the material spread, or more particularly from remaining in the material spread, gathering wing units 50 are provided at the rear ends of the runners 25, said wing units each consisting of an arm 51 connected at 52 to the rear end of each runner, and a V-shaped member 53 at the end of each arm 51, the member 53 being adjustable vertically as will be readily understood, depending upon the amount of material to be gathered thereby.

I claim:

1. In a material spreader of the class described, in combination, a rigid frame unit extending transversely of the surface to be covered and supported for movement over said surface by a runner member at each end thereof arranged to support the entire unit and bridge the gaps in the surface contacted by the runner members, a screed carried by said unit for leveling materials deposited in advance thereof, a hopper unit in advance of the screed and pivotally connected at the rear thereof to said runner members for pivotal movement relative thereto, said hopper unit including means to limit the said pivotal movement, a transverse discharge opening for said hopper substantially adjacent the pivotal connection aforesaid, elements to connect said hopper unit to a towing vehicle whereby the entire spreader is caused to move thereby, said screed being entirely supported by the frame unit and adjustable relative thereto, and said hopper unit being equipped with surface contacting supporting rollers in advance thereof.

2. In a material spreader of the class described, in combination, a rigid frame member adapted to extend transversely of the surface to be covered by material, a runner at each end of said member to support said member for longitudinal travel movement, a screed connected to said frame member and substantially coextensive therewith, a material storage and supply hopper arranged in advance of the frame member, the rear portion of said hopper being supported by and pivotally connected for free rotation to the runners aforesaid about midway between the ends of the latter, the discharge opening substantially adjacent and extending transversely in advance of the pivotal connection of the hopper and runners, parts to support the forward portion of said hopper and to position the hopper for travel movement comprising rollers movable in advance of the hopper said rollers being spaced transversely and journaled to the hopper near the ends thereof, and parts extending from the hopper for non-rigid connection to a towing vehicle whereby to cause movement of the entire spreader.

References Cited in the file of this patent

UNITED STATES PATENTS

| | | |
|---|---|---|
| 1,470,157 | Fike | Oct. 9, 1923 |
| 1,979,619 | Hemstreet et al. | Nov. 6, 1934 |
| 2,054,437 | Mosel | Sept. 15, 1936 |
| 2,185,645 | Mosel | Jan. 2, 1940 |
| 2,252,717 | Lundbye | Aug. 19, 1941 |

FOREIGN PATENTS

| | | |
|---|---|---|
| 843,856 | Germany | Sept. 15, 1952 |